United States Patent
Odate

(10) Patent No.: US 8,818,643 B2
(45) Date of Patent: Aug. 26, 2014

(54) SEATBELT DEVICE

(75) Inventor: Shotaro Odate, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 13/642,272

(22) PCT Filed: Mar. 31, 2011

(86) PCT No.: PCT/JP2011/058232
§ 371 (c)(1),
(2), (4) Date: Oct. 19, 2012

(87) PCT Pub. No.: WO2011/132513
PCT Pub. Date: Oct. 27, 2011

(65) Prior Publication Data
US 2013/0041559 A1 Feb. 14, 2013

(30) Foreign Application Priority Data
Apr. 23, 2010 (JP) ................................ 2010-100063

(51) Int. Cl.
*B60R 22/00* (2006.01)

(52) U.S. Cl.
USPC .............. 701/45; 242/374; 280/806; 297/475

(58) Field of Classification Search
USPC .......... 701/36, 45–47; 242/374, 390.8, 390.9; 297/475–478; 280/806, 807
See application file for complete search history.

(56) References Cited

U.S. PATENT DOCUMENTS

| | | | | |
|---|---|---|---|---|
| 7,573,842 B2 * | 8/2009 | Xie et al. | ...................... | 370/311 |
| 2002/0166916 A1 * | 11/2002 | Fujii et al. | .................. | 242/390.9 |
| 2005/0077717 A1 * | 4/2005 | Midorikawa | .................. | 280/806 |
| 2005/0083000 A1 * | 4/2005 | Specht et al. | .................. | 318/432 |
| 2005/0253012 A1 * | 11/2005 | Tanaka et al. | .............. | 242/390.9 |
| 2006/0065771 A1 * | 3/2006 | Takao et al. | .................... | 242/374 |
| 2006/0145463 A1 * | 7/2006 | Isaji et al. | ..................... | 280/806 |
| 2007/0001047 A1 * | 1/2007 | Yasuda et al. | .............. | 242/379.1 |
| 2007/0090224 A1 * | 4/2007 | Ng et al. | ....................... | 242/374 |
| 2008/0093833 A1 * | 4/2008 | Odate | ........................... | 280/806 |
| 2008/0173748 A1 * | 7/2008 | Odate et al. | ................. | 242/390.9 |
| 2010/0095787 A1 * | 4/2010 | Murphy et al. | ........... | 73/862.391 |

FOREIGN PATENT DOCUMENTS

| | | |
|---|---|---|
| EP | 2017142 A1 | 1/2009 |
| EP | 2077209 A1 | 7/2009 |
| EP | 2199160 A1 | 6/2010 |
| EP | 2218614 A1 | 8/2010 |
| JP | 2005-028970 | 2/2005 |
| JP | 2007-069897 | 3/2007 |
| JP | 2008-120194 | 5/2008 |

OTHER PUBLICATIONS

European Search Report, Application No. 11771850.2, Mailed Dec. 18, 2012, 7 pages.

* cited by examiner

*Primary Examiner* — Helal A Algahaim
*Assistant Examiner* — Shardul Patel
(74) *Attorney, Agent, or Firm* — Rankin, Hill & Clark LLP

(57) ABSTRACT

In this seatbelt device, when a lock release determining device determines that a lock has been released, and a command for driving a motor is output while a wind-up operation is performed by the motor to release the lock, and a priority of the command is equal to or higher than a predetermined level, a control device controls the motor so as to apply tension to a webbing.

8 Claims, 5 Drawing Sheets

SEATBELT DEVICE

TECHNICAL FIELD

The present invention relates to a seatbelt device.

Priority is claimed on Japanese Patent Application No. 2010-100063, filed on Apr. 23, 2010, the content of which is incorporated herein by reference.

BACKGROUND ART

Among seatbelt devices, there are those that wind up a webbing by using a motor. These seatbelt devices control a retractor so that a passenger is not restrained unnecessarily due to wind-up of the webbing by the motor. Specific control of such a retractor includes, for example as described in Patent Document 1, a step of tensioning the webbing by driving the motor in a wind-up direction of the webbing, a step of automatically monitoring a specific release criteria in order to release the webbing after completing application of tension to the webbing, and a step of starting drive of the motor for a short time in a pull-in direction of the webbing in order to release a locking member when the release criteria is satisfied.

PRIOR ART DOCUMENT

Patent Document

[Patent Document 1] Japanese Unexamined Patent Application, First Publication No. 2007-69897

DISCLOSURE OF INVENTION

Problems to be Solved by the Invention

However, in the conventional seatbelt device described above, a request for a pull-in operation of the webbing may occur again during a release operation of the webbing. In this case, the motor is driven to satisfy the pull-in operation request this time, regardless of the level of the pull-in operation of the webbing performed the previous time. Accordingly, for example, although sufficient tension is applied to the webbing by the pull-in operation of the webbing the previous time, the webbing may be pulled in again, thereby giving an uncomfortable feeling to the passenger.

Therefore it is an object of the present invention to provide a seatbelt device that, when there is a wind-up request of the webbing during a locking release operation for releasing the webbing, can drive a motor according to a wind-up situation of the webbing at a previous time to restrain the passenger appropriately.

Means for Solving the Problem (1) In order to achieve the above object, a first aspect of the present invention provides a seatbelt device installed in a vehicle, that comprises: a webbing; a reel that winds the webbing; a motor that drives the webbing via the reel; a clutch that can change over between a disconnecting position at which a drive force of the motor is not transmitted to the reel and a connecting position at which the drive force is transmitted to the reel; a vehicle condition detecting device that detects a vehicle condition of the vehicle; a command output device that outputs a command for driving the motor based on the vehicle condition detected by the vehicle condition detecting device; a priority determining device that determines a priority of the command output from the command output device; a seatbelt lock device that locks pull-out of the webbing; a lock state detecting device that detects a lock state of the webbing by the seatbelt lock device; a lock release determining device that determines whether lock of the webbing has been released, after detection of the lock state of the webbing by the lock state detecting device; and a control device that controls the motor so as to apply tension to the webbing, when it is determined that the lock has been released by the lock release detecting device, and the command for driving the motor is output while a wind-up operation is being performed by the motor to release the lock of the webbing and the priority of the command is equal to or higher than a predetermined level.

(2) In the seatbelt device described in (1) above, when the lock release determining device determines that the lock has been released, and when the priority of the command at present is equal to or higher than the predetermined level and a drive current of the motor due to the command at a previous time exceeds a predetermined value, the control device may not accept the present command.

(3) In the seatbelt device described in (1) above, when the lock release determining device determines that the lock has been released, and the priority of the command at present is lower than the predetermined level, the control device may continue a lock release operation.

(4) In the seatbelt device described in (1) above, when the lock release determining device determines that the lock has been released, the motor is being driven to change over the clutch to the disconnecting position, and the priority of the command is equal to or higher than the predetermined level, the control device may stop drive of the motor for a certain period of time.

(5) In the seatbelt device according to any one of (1) to (4) described above, the lock release determining device may also determine whether a state is maintained in which the motor is driven in a pull-in direction of the webbing and the lock state of the webbing is not detected by the lock state detecting device, and when the lock release determining device determines that the state in which the lock state of the webbing is not detected by the lock release determining device is maintained, and the command for driving the motor is output while the motor is performing the wind-up operation so that a lock state of the webbing does not occur, and the priority of the command is equal to or higher than the predetermined level, the control device may apply tension to the webbing.

Effects of the Invention

According to (1) described above, when it is determined that the lock has been released by the lock release determining device, and the motor is performing the wind-up operation to release the lock, a command to wind up the webbing by driving the motor may be output. In such a case, when the priority of the output command is equal to or higher than a certain level, the control device controls the motor so as to apply tension to the webbing. Accordingly, a request to restrain the passenger reliably, which has a high priority, can be handled.

According to (2) described above, under a situation where the drive current of the motor exceeds the predetermined value in the former restraint request, when it is determined that it is necessary to release the lock of a seat belt and when the restraint request should take precedence again, the passenger is still restrained by the seat belt even though the unlocking process of the seat belt has started due to the above determination. Accordingly, a situation in which the passenger is restrained further by the webbing can be avoided, and it can be prevented that the passenger is restrained too much and has an uncomfortable feeling.

According to (3) described above, there is a case in which it is determined whether the lock has been released, and a restraint request of the passenger is issued again in a state of changing to the lock release state, and the priority is lower than a certain level. In this case, the passenger has already been restrained to some extent. Therefore, further restraint of the passenger can be avoided and it can be prevented that the passenger is restrained too much and has an uncomfortable feeling.

According to (4) described above, when there is a restraint request having a high priority in a state with the motor being driven, for example, in a reverse direction to change the clutch to the disconnecting position, the motor is not driven suddenly in a normal direction. Therefore, a drive circuit of the motor can be protected.

According to (5) described above, there may be a case in which there is a restraint request of the passenger, and thereafter, the webbing is not locked and the clutch is also at the connecting position. In such a case, even in a state in which the motor is driven so that the webbing is maintained so as not to be pulled out, the motor can be handled in the same manner as when the motor is rotated in the normal direction to release the lock of the webbing. Consequently, the load acting on the motor can be reduced, and the motor can be controlled without giving an uncomfortable feeling to the passenger.

BEST MODE FOR CARRYING OUT THE INVENTION

Next is a description of an embodiment of the present invention, based on the drawings.

Figure 1:
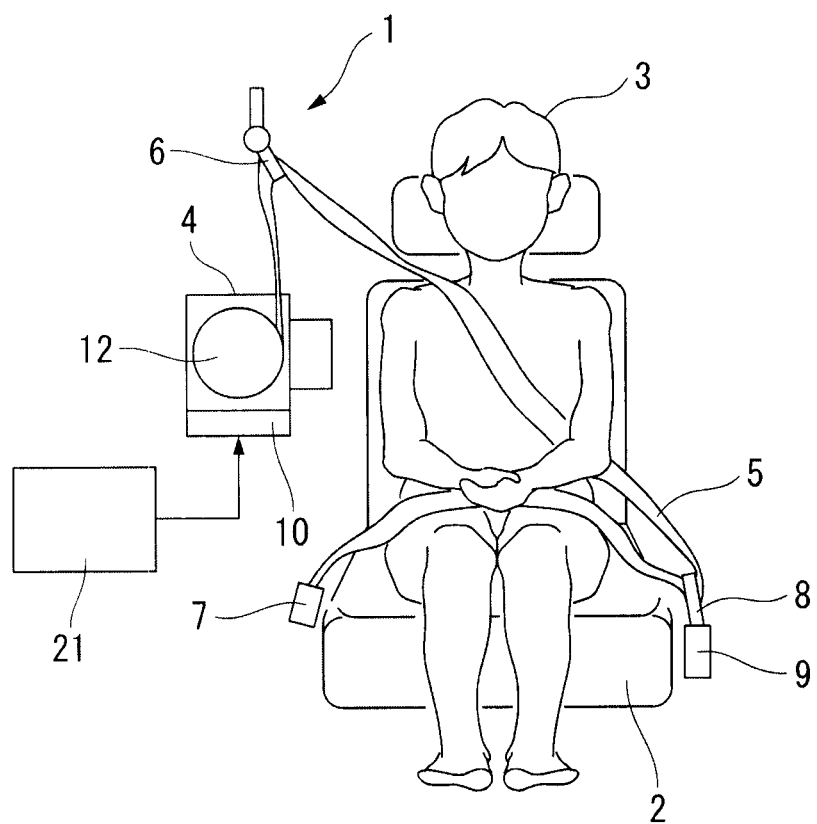
FIG. 1 is a schematic configuration diagram of a seatbelt device according to an embodiment of the present invention.

FIG. 1 is an explanatory diagram of a seatbelt device 1 according to the embodiment of the present invention. A retractor 4 that winds up a webbing 5 for restraining a passenger 3 is arranged inside a center pillar (not shown) on a side of a seat 2. The webbing 5 pulled out upward from the retractor 4 is inserted into a through anchor 6 supported on an upper part of the center pillar (not shown). The end of the webbing 5 is fixed to a vehicle floor via an outer anchor 7 on a lateral wall of the seat 2. Moreover, a tongue plate 8 through which the webbing 5 is inserted between the through anchor 6 and the outer anchor 7, is detachable with respect to a buckle 9 provided on the vehicle floor on an inner wall side of the seat 2, to constitute a so-called three-point seatbelt device 1.

In an initial state, the webbing 5 is wound up by the retractor 4, and the webbing 5 is pulled out and the tongue plate 8 is fixed to the buckle 9 by a hand of the passenger 3, thereby restraining the passenger 3 to the seat 2 mainly by a chest part and an abdominal part. The seatbelt device 1 automatically performs pull-in (drive) of the webbing 5 by an electric motor 10 at the time of an emergency or when a behavior change of the vehicle is large. Specifically, when there is an emergency actuation request, a skidding actuation request, a rapid steering actuation request, a minor collision actuation request, an alarm actuation request, a slackness removing actuation request, or a posture holding actuation request, the motor 10 is driven to pull in the webbing 5.

Figure 2:
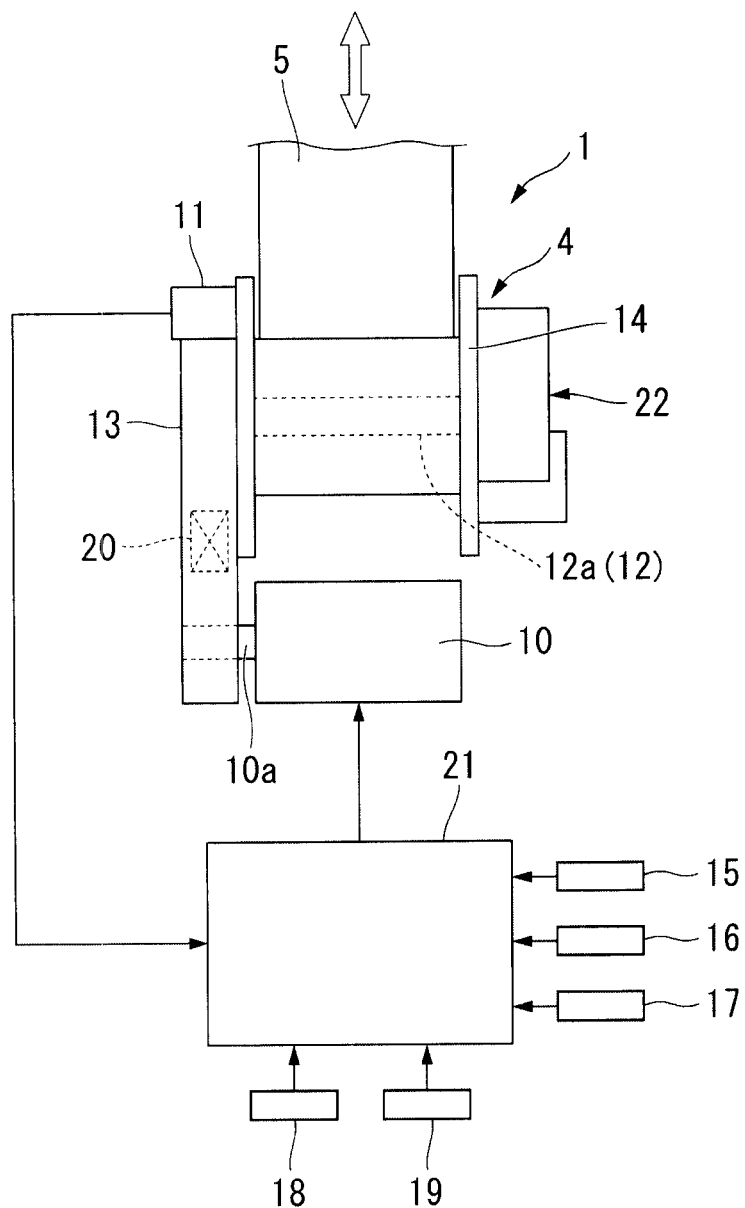
FIG. 2 is a schematic configuration diagram of a retractor and a controller in the embodiment.

As shown in FIG. 2, the retractor 4 includes a reel 12 rotatably housed in a casing 14. The webbing 5 is wound around the reel 12. A shaft of the reel 12 protrudes to one end side of the casing 14. The reel 12 is connected to a rotation shaft 10a of the motor 10 via a power transmission mechanism 13 including a clutch 20. Accordingly, transmission and cutoff of the drive force of the motor 10 to the reel 12 can be changed over (can be disconnected or connected) by setting the clutch 20 to a connecting position or a disconnecting position. The power transmission mechanism 13 transmits slowed down rotation of the motor 10 to the reel 12. Moreover, a return spring (not shown) that urges the reel 12 in a webbing wind-up direction is provided in the retractor 4, so that an urging force in the webbing wind-up direction by the return spring acts on the reel 12. The clutch 20 can be changed over between an on state and an off state, triggered by rotation in the normal direction of the motor 10 (webbing wind-up direction) and rotation in a reverse direction (webbing pull-out direction).

Moreover, a rotation sensor 11 that detects a rotation position of the reel 12 is provided in the retractor 4. The rotation sensor 11 includes, for example, a magnetic circular disk that is magnetized with different magnetic poles alternately around a circumferential direction and rotates together with the reel 12, a pair of Hall elements arranged close to an outer peripheral edge of the magnetic circular disk, and a sensor circuit that processes a detection signal from the Hall element. A pulse signal processed by the sensor circuit of the rotation sensor 11 is output to a controller 21.

The pulse signal input from the sensor circuit to the controller 21 corresponding to the rotation of the reel 12 is used for detecting a rotation amount, rotation speed, rotation direction, and the like of the reel 12. That is to say, the controller 21 detects a rotation amount of the reel 12 (pull-out amount of the webbing 5) by counting the pulse signal. Moreover, the controller 21 calculates a change speed (frequency) of the pulse signal to acquire a rotation speed of the reel 12 (wind-up/pull-out speed of webbing 5). Furthermore, the controller 21 detects the rotation direction of the reel 12 by comparing the rise of waveforms of the both pulse signals.

To the input side of the controller 21, in addition to the rotation sensor 11, there is connected; a vehicle speed sensor 15 that detects the traveling speed of the vehicle, a back and forth acceleration sensor 16 that detects a rate of acceleration in a back and forth direction acting on the vehicle, a side acceleration sensor 17 that detects a rate of acceleration in a left and right direction acting on the vehicle, a yaw rate sensor 18 that detects a yaw rate acting on the vehicle, and a wheel speed sensor 19 used for acquiring a slip ratio of wheels. Moreover, when the vehicle is in an unstable condition, the controller 21 communicates with a VSA (vehicle stability assist) controller that comprehensively controls the output of a engine and a braking force of a brakes to suppress any disturbance of the behavior of the vehicle. In the embodiment, the vehicle speed sensor 15, the back and forth acceleration sensor 16, the side acceleration sensor 17, the yaw rate sensor 18, and the wheel speed sensor 19 constitute a vehicle condition detecting device that detects the vehicle condition.

Moreover, in the retractor 4 there is provided an emergency lock mechanism 22 that locks the rotation of the reel 12 to mechanically lock pull-out of the webbing, when an acceleration larger than a predetermined value acts on the vehicle or when there is an attempt to pull out the webbing 5 rapidly.

Figure 3:
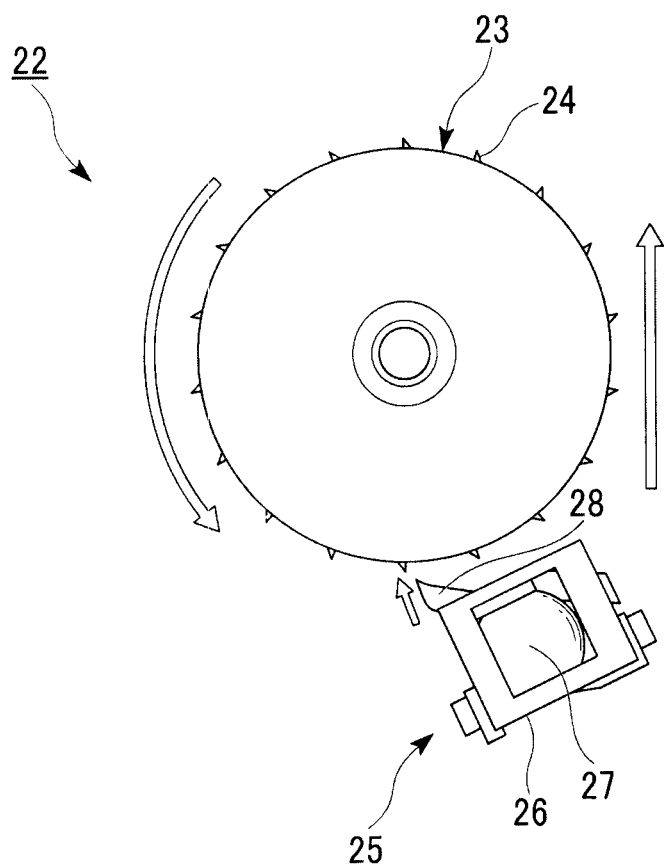
FIG. 3 is an explanatory diagram showing the relevant parts of an emergency lock mechanism in the embodiment.

FIG. 3 shows the relevant parts of the emergency lock mechanism 22 provided in the retractor 4. The emergency lock mechanism 22 includes a lock actuation drum 23 and a ball sensor 25.

The lock actuation drum 23 is fitted to a reel shaft 12a with small frictional resistance. The lock actuation drum 23 rotates integrally with the reel 12 at the time of normal rotation of the reel 12. When a force in an opposite direction is applied to between the lock actuation drum 23 and the reel 12, the lock actuation drum 23 turns relatively to the reel 12 in a range of a set angle.

The lock actuation drum 23 includes a plurality of clutch teeth 24 on the periphery thereof.

The ball sensor 25 includes a sensor case 26 and a sensor weight 27 arranged within an accommodation section thereof. A latch claw 28 is integrally fitted to the sensor weight 27. The sensor weight 27 swings corresponding to the acceleration of the vehicle, and when it swings more than a specified amount, the latch claw 28 engages with the clutch teeth 24 of the lock actuation drum 23.

When the latch claw 28 of the sensor weight 27 of the ball sensor 25 is latched to the clutch teeth 24 of the lock actuation drum 23, the lock actuation drum 23 is locked. Moreover, when the webbing 5 receives a force in a pull-out direction, the lock actuation drum 23 rotates relatively to the reel 12. In conjunction therewith, the reel 12 is locked on the side wall of the casing 14 via a lock member (not shown), and the reel 12 is locked to the casing 14.

Figure 4:
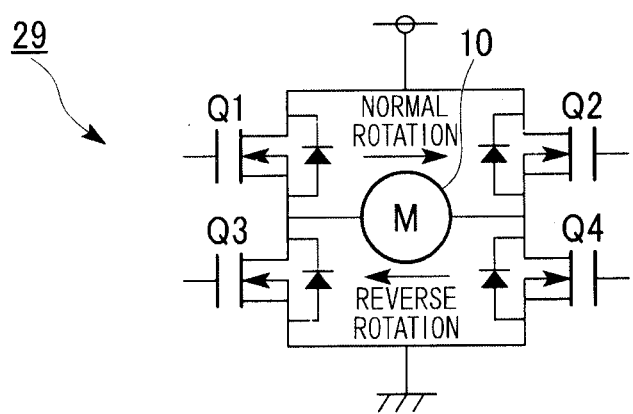
FIG. 4 is a circuit diagram showing an H bridge circuit that drives a motor in the embodiment.

FIG. 4 shows an H bridge circuit 29 illustrating a part of a drive device of the motor 10. The H bridge circuit 29 includes four switching elements Q1, Q2, Q3, and Q4.

When the switching elements Q1 and Q4 are on and the switching elements Q2 and Q3 are off, the motor 10 rotates in the normal direction to rotate the reel 12 in a wind-up direction of the webbing 5. This causes the clutch 20 to come on. On the other hand, when the switching elements Q2 and Q3 are on and the switching elements Q1 and Q4 are off, the motor 10 rotates in the reverse direction to rotate the reel 12 in the wind-off direction of the webbing 5. This causes the clutch 20 to go off.

Figure 5:
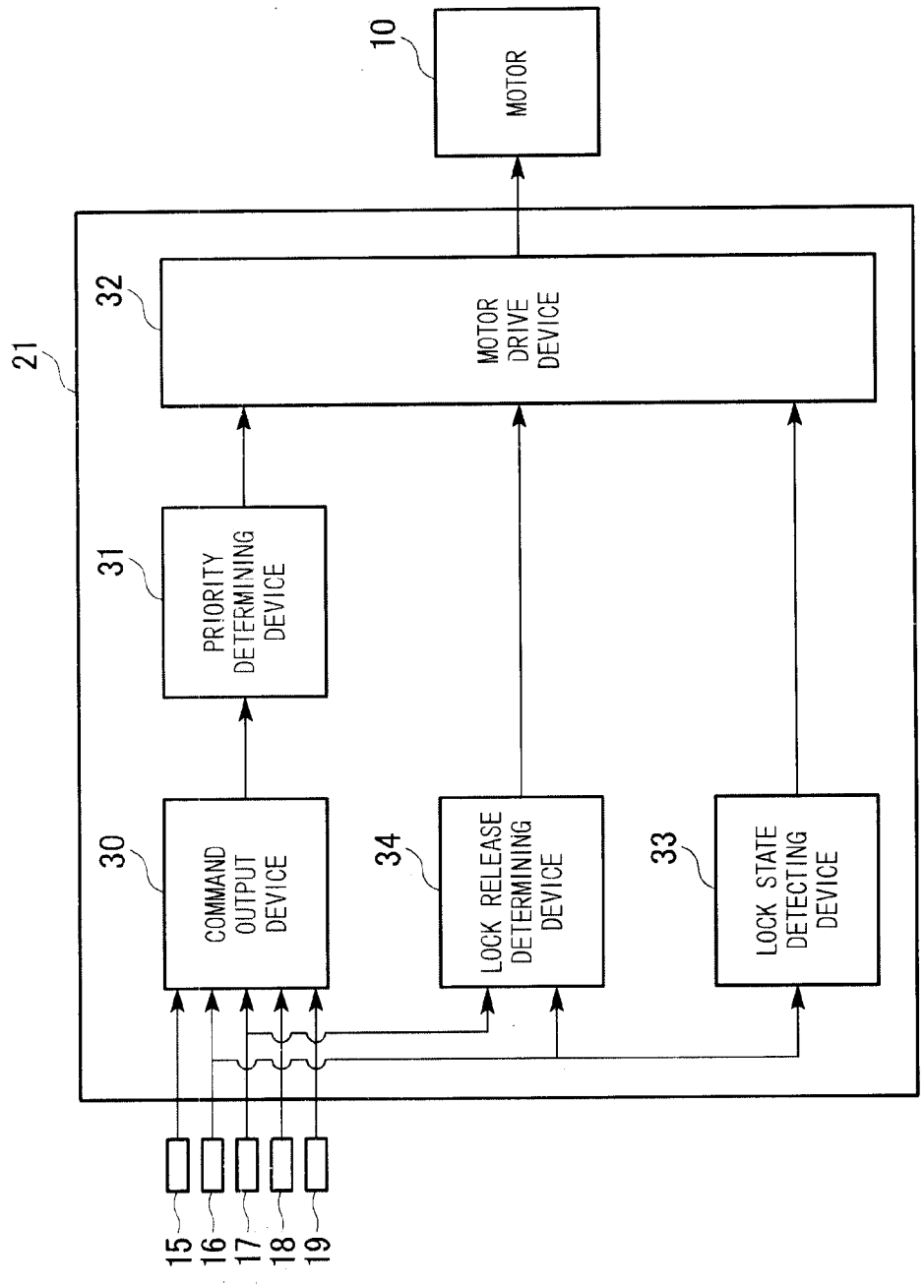
FIG. 5 is a block diagram around the controller in the embodiment.

FIG. 5 is a block diagram showing a process performed by the controller 21. Signals from the vehicle speed sensor 15, the back and forth acceleration sensor 16, the side acceleration sensor 17, the yaw rate sensor 18, and the wheel speed sensor 19 are input to the controller 21. A command output device 30 outputs a command for driving the motor 10 based on these input signals.

The command output device 30 selects a mode for driving the motor 10 based on the input signals, and outputs a drive signal of the motor 10 corresponding to the mode. Here the drive signal corresponds to a current value and a rotation direction (normal direction and reverse direction) for driving the motor 10.

As the mode, there are various restraint control modes such as; an emergency actuation request mode preparing for a frontal collision in which the passenger 3 needs to be restrained promptly, a skidding actuation request mode for restraining the passenger 3 at the time of vehicle turning and the like, a rapid steering actuation request mode for restraining the passenger 3 at the time of rapid steering of a steering wheel, a minor collision actuation request mode for restraining the passenger 3 at the time of a minor collision, an alarm actuation request mode in which an intermittent restraining operation is performed to urge the passenger 3 to apply the brakes, a slackness removing actuation request mode for removing slackness of the webbing 5, and a posture holding actuation request mode for holding the posture.

Moreover, there is a release actuation mode for releasing restraint by the webbing 5 contrary to the restraint control mode. The release actuation mode includes a lock release wind-up actuation mode for rotating the motor 10 in the reverse direction to release the lock of the reel 12, that is, the lock of the webbing 5, and a release reverse actuation mode for separating the clutch 20 from the motor 10. When the restraint control mode is finished, the mode shifts to the release actuation mode.

The release actuation mode also includes a lock suppression mode in which the motor 10 is driven to maintain a state in which pull-out of the webbing 5 is not locked, but pull-out is not performed.

Here, because the restraint control modes may be concentrically-requested, it is necessary to determine which of the modes should be selected first. A priority determining device 31 determines a priority of the command output from the command output device 30. A mode prioritized by the priority determining device 31 is selected. Figures in ( ) below indicate an order of precedence, and as the figure decreases, the priority becomes higher.

In the embodiment, the priority becomes higher in order of (1) emergency actuation request mode, (2) skidding actuation request mode, (3) rapid steering actuation request mode, (4) minor collision actuation request mode, (5) alarm actuation request mode, and (6) slackness removing actuation request mode and posture holding actuation request mode. For example, drive current values of the motor 10 are indicated such as 20 A (ampere) (hereinafter, simply referred to as "A") in the emergency actuation request mode, 1 A to 20 A in the skidding actuation request mode and the rapid steering actuation request mode, and 1 A in the minor collision actuation request mode, the alarm actuation request mode, the slackness removing actuation request mode, and the posture holding actuation request mode. In the respective restraint modes, the motor 10 rotates in the normal direction.

A signal from the priority determining device 31 is input to a motor drive device 32 including the H bridge circuit 29 described above, to drive the motor 10.

Meanwhile, a lock state detecting device 33 compares a detection result of the back and forth acceleration sensor 16 with the rate of acceleration for moving the ball sensor 25, which is well known. Accordingly, the lock state detecting device 33 detects whether the reel 12 is locked, that is, the webbing 5 is in a lock state. The detection result thereof is input to the motor drive device 32. When the detection result of the back and forth acceleration sensor 16 is higher than the rate of acceleration for moving the ball sensor 25, it is determined that the reel 12 is in the lock state.

Moreover, a lock release determining device 34 compares a resultant acceleration acquired by the back and forth acceleration sensor 16 and the side acceleration sensor 17 with a predetermined value, based on the detection results of the back and forth acceleration sensor 16 and the side acceleration sensor 17. Consequently, the lock release determining device 34 determines whether the lock has been released, and a determination result thereof is input to the motor drive device 32. When the value of the resultant acceleration is smaller than the predetermined value, it is determined that the reel 12, that is, the webbing 5 is in a lock release state. Here, the lock release determining device 34 drives the motor 10 in the pull-in direction of the webbing 5 to determine whether a state in which the lock state detecting device 33 does not detect the lock state of the webbing 5 is maintained.

Figure 6:
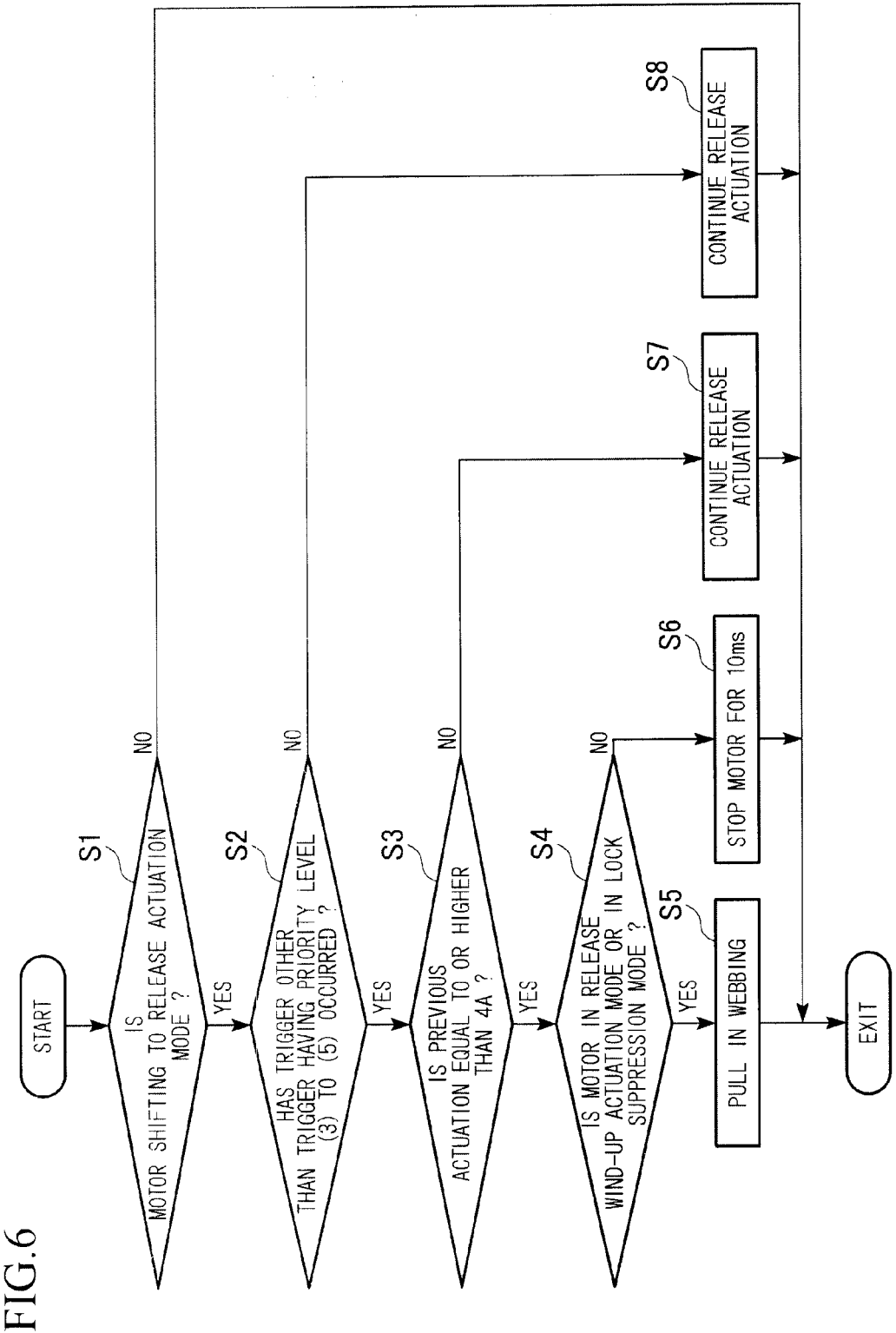
FIG. 6 is a flowchart showing drive control of the motor in the embodiment.

FIG. 6 is a flowchart showing a process performed by the controller 21 when the motor 10 is being shifted to the release actuation mode, that is, when it is requested to restrain the passenger 3 again during the release operation of the webbing 5.

At the time of an emergency, an operation mode for pulling in the webbing 5 by the motor 10 to restrain the passenger, that is, the restraint control mode is required. At this time, to drive the motor 10, the clutch 20 needs to be connected (a state in which power transmission is possible). Moreover, when the webbing 5 is rapidly pulled out due to movement of the passenger 3, the reel 12 may be locked. Thereafter, in order to release restraint of the passenger, release actuation by the motor 10 is performed.

The release actuation mode includes; the lock release wind-up actuation mode for rotating the motor 10 in the reverse direction to release the lock of the reel 12, the release reverse actuation mode for cutting off the power of the motor 10 by the clutch 20, and a lock suppression mode to drive the motor 10 for maintaining a state in which pull-out of the webbing 5 is blocked so that the reel 12 is not locked.

When the restraint control mode is finished, the motor shifts to the release actuation mode. While the motor is shifting to this release mode, the restraint control mode may be requested again. In this case, it is required to optimize the control of the motor 10 in the restraint control mode this time according to the previous restraint control mode finished immediately before. Therefore, control described below is performed.

In step S1, it is determined whether the motor is shifting to the release actuation mode in which the webbing 5 is pulled in by the motor 10 to release restraint of the passenger 3. When the determination result in step S1 is negative (NO), and the motor is not shifting to the release mode, the process is finished. When the determination result in step S1 is positive (YES), and the motor is currently shifting to the release actuation mode, it is determined in step S2 whether a request trigger of the restraint control mode requested this time is a trigger of other than (3) rapid steering actuation request mode, (4) minor collision actuation request mode, and (5) alarm actuation request mode in the priority level. That is, it is determined whether the trigger is a trigger of (1) emergency actuation request mode or (2) skidding actuation request mode.

When the determination result in step S2 is negative (NO), and the generated trigger is any one of (3) rapid steering actuation request mode, (4) minor collision actuation request mode, and (5) alarm actuation request mode, the trigger is ignored in step S8 to continue the lock release actuation, and the process is finished. In this case, because a previous pulled-in portion of the webbing 5 remains, there is no problem even if the lock release actuation is continued. On the contrary, when the webbing 5 is pulled in again, restraint of the passenger is progressed and the passenger may have an uncomfortable feeling.

When the determination result in step S2 is positive (YES), and when a trigger of (1) emergency actuation request mode or (2) skidding actuation request mode occurs, in step S3, it is determined whether the drive current of the motor 10 in the previous restraint control mode is equal to or lower than 4 A (predetermined value). The reason why the threshold is set to 4 A is that, because the acceleration applied to the passenger changes in (2) skidding actuation request mode and (3) rapid steering actuation request mode, the current value varies (for example, in a range of from 1 A to 20 A) according thereto, and hence, the process is divided.

When the determination result in step S3 is negative (NO), the flow proceeds to step S7, where the trigger is ignored and the lock release actuation is continued as in step S8 to finish the process. In this case, because the previous drive current of the motor 10 exceeds 4 A, the previous pulled-in portion of the webbing 5 remains, and there is no problem even if the lock release operation is continued. On the contrary, when the webbing 5 is pulled in again, restraint of the passenger is progressed and the passenger may have an uncomfortable feeling.

When the determination result in step S3 is positive (YES), in step S4, it is determined whether the mode is in the release wind-up actuation mode in which the motor 10 is driven in the normal direction, or in the lock suppression mode.

When the determination result in step S4 is positive (YES), in step S5, the pull-in operation of the webbing corresponding to the trigger of (1) emergency actuation request mode or (2) skidding actuation request mode is performed, and the process is finished. In this case, because the previous drive current of the motor is as small as 4 A or less, the previous pulled-in amount of the webbing is small. Moreover, in this case, because the motor this time is in (1) emergency actuation request mode or (2) skidding actuation request mode having urgency, it is required to restrain the passenger quickly.

When the determination result in step S4 is negative (NO), in step S6, the motor 10 is stopped for 10 milliseconds (ms) to finish the process. A case in which the determination result in step S4 is negative means the release reverse actuation mode of the release actuation modes, in which the motor 10 is rotated in the reverse direction and the clutch 20 is changed to the disconnecting position at which power is not transmitted. In the release reverse actuation mode, because the motor 10 is rotated in the reverse direction and the clutch 20 is at the disconnecting position, the motor 10 rotated in the reverse direction needs to be rotated in the normal direction suddenly at the triggered timing.

However, if the motor 10 rotated in the reverse direction is suddenly rotated in the normal direction, both of the switching elements Q2 and Q3 for rotation in the reverse direction, which have been turned on, and the switching elements Q1 and Q4 that will be turned on by the normal rotation, of the H bridge circuit 29 shown in FIG. 4, are turned on simultaneously, and a through current flows and is directly grounded. Therefore, the motor 10 is once stopped to prevent the through current flow. Thereafter, the release reverse actuation mode is continued. Accordingly, the H bridge circuit 29 can be protected.

In the seatbelt device 1 described above, the webbing 5 is pulled in by the motor 10 to restrain the passenger 3 with priority, based on the vehicle state such as posture holding, skidding, rapid steering, or sudden braking, detected by using the vehicle speed sensor 15, the back and forth acceleration sensor 16, the side acceleration sensor 17, the yaw rate sensor 18, and the wheel speed sensor 19. When restraint of the passenger 3 based on the priority is completed and restraint of the passenger 3 by the webbing 5 is to be released, the vehicle state may further change and the passenger 3 may be required to be restrained again. According to the present embodiment, even in such a case, the motor 10 can be appropriately controlled, taking into consideration the previous situation in which the passenger 3 is restrained by the webbing 5.

For example, when the motor 10 is performing the wind-up operation to release the lock, a command to further drive the motor 10 and wind up the webbing 5 may be output. In this case, if the priority level of the output request is higher than a certain level (in the emergency actuation request mode or the skidding actuation request mode), the motor 10 is controlled to apply tension to the webbing 5. Consequently, a request having a high priority to restrain the passenger 3 can be reliably handled.

When there is a restraint request having a high priority (emergency actuation request mode or skidding actuation request mode) in a state in which the motor 10 is driven, for example, in the reverse direction for changing the clutch 20 to the disconnecting position, the seat belt device 1 stops the motor 10 for 10 milliseconds. Consequently, the motor 10 is not driven in the normal direction suddenly and the drive circuit of the motor 10 and the H bridge circuit 29 can be protected.

When the previous restraint request is such that the drive current of the motor 10 exceeds 4 A, and there is a situation in which restraint of the passenger 3 by the webbing 5 is to be released, a restraint request having a high priority (emergency actuation request mode or skidding actuation request mode) may occur again. In this case, the passenger 3 has been restrained to some extent, even in a state in which the motor is shifting to the lock release mode. Consequently, a situation in which the passenger 3 is further restrained by the webbing 5 can be avoided, and it can be prevented that the passenger 3 is excessively restrained and has an uncomfortable feeling.

Moreover, at the time of releasing restraint of the passenger 3 by the webbing 5, when the priority of the command this time is lower than the certain level (in the rapid steering actuation request mode, the minor collision actuation request mode, or the alarm actuation request mode), the seatbelt device 1 continues the lock release operation. At this time, because the passenger 3 has been restrained already, further restraint of the passenger 3 can be avoided and it can be prevented that the passenger 3 is excessively restrained and has an uncomfortable feeling.

Furthermore, in the seatbelt device 1, there may be a case in which there is a restraint request of the passenger 3, and thereafter, the webbing 5 is not locked and the clutch 20 is at the connecting position. At this time there may be a state in which the motor 10 is driven and the webbing 5 is maintained so as not to be pulled out. Even in this state, by handling the situation in the same manner as in the case in which the motor 10 is rotated in the normal direction to release the lock of the webbing 5, the load acting on the motor 10 can be reduced and the motor 10 can be controlled without giving the passenger 3 an uncomfortable feeling.

The preferred embodiment of the present invention has been described above. However the present invention is not limited to the above embodiment. Addition, omission, replacement, and other changes of the configuration can be made without departing from the scope of the present invention. The present invention is not limited by the above description, and is limited only by the scope of appended claims.

For example, in the above-described embodiment, the priority of the modes is from the first place (1) emergency actuation request mode to the fifth place (5) alarm actuation request mode, and the "predetermined level" as a threshold is set to the second place. The priority determining device determines whether the mode is equal to or higher than the second place (the first place or the second place) or lower than the second place (the third place to the fifth place). However, the "predetermined level" is not limited to the second place, and can be an arbitrary level according to the number of modes and the type of the mode. That is to say, in the above-described embodiment, any of the first place to the fifth place can be set as the "predetermined level". Moreover, when the number of modes increases to 6 or more, the number of levels increases, and when the number of modes decreases to 4 or less, the number of levels also decreases.

INDUSTRIAL APPLICABILITY

According to this seatbelt device, when there is a wind-up request of the webbing at the time of performing the lock release operation to release the webbing, the motor can be driven corresponding to the previous wind-up situation of the webbing to restrain the passenger appropriately.

BRIEF DESCRIPTION OF THE REFERENCE SYMBOLS

5 Webbing
12 Reel
13 Power transmission mechanism (transmission mechanism)
10 Motor
20 Clutch
15 Vehicle speed sensor (vehicle condition detecting device)
16 Back and forth acceleration sensor (vehicle condition detecting device)
17 Side acceleration sensor (vehicle condition detecting device)
18 Yaw rate sensor (vehicle condition detecting device)
19 Wheel speed sensor (vehicle condition detecting device)
30 Command output device
31 Priority determining device
22 Emergency lock mechanism (seatbelt lock device)
33 Lock state detecting device
34 Lock release determining device
21 Controller (control device)

The invention claimed is:

1. A seatbelt device installed in a vehicle, comprising:
a webbing;
a reel that winds said webbing;
a motor that drives said webbing via said reel;
a clutch that can change over between a disconnecting position at which a drive force of said motor is not transmitted to said reel and a connecting position at which said drive force is transmitted to said reel;
a vehicle condition detecting device that detects a vehicle condition of said vehicle;
a command output device that outputs a command for driving said motor based on said vehicle condition detected by said vehicle condition detecting device;
a priority determining device that determines a priority of said command output from said command output device;
a seatbelt lock device that locks pull-out of said webbing;
a lock state detecting device that detects a lock state of said webbing by said seatbelt lock device;
a lock release determining device that determines whether lock of said webbing has been released, after detection of the lock state of said webbing by said lock state detecting device; and
a control device that controls said motor so as to apply tension to said webbing, when it is determined that said lock has been released by said lock release detecting device, and said command for driving said motor is output while a wind-up operation is being performed by said motor to release the lock of said webbing and the priority of said command is equal to or higher than a predetermined level.

2. A seatbelt device according to claim 1, wherein when said lock release determining device determines that said lock has been released, and when the priority of said command at present is equal to or higher than the predetermined level and a drive current of said motor due to said command at a previous time exceeds a predetermined value, said control device does not accept said present command.

3. A seatbelt device according to claim 1, wherein when said lock release determining device determines that said lock has been released, and the priority of said command at present is lower than the predetermined level, said control device continues a lock release operation.

4. A seatbelt device according to claim 1, wherein when said lock release determining device determines that said lock has been released, said motor is being driven to change over said clutch to said disconnecting position, and the priority of said command is equal to or higher than the predetermined level, said control device stops drive of said motor for a certain period of time.

5. A seatbelt device according to claim 1, wherein
said lock release determining device determines whether a state is maintained in which said motor is driven in a pull-in direction of said webbing and the lock state of said webbing is not detected by said lock state detecting device, and
when the lock release determining device determines that the state in which the lock state of said webbing is not detected by said lock release determining device is maintained, and said command for driving said motor is output while the motor is performing the wind-up operation so that a lock state of said webbing does not occur, and the priority of said command is equal to or higher than the predetermined level, said control device applies tension to said webbing.

6. A seatbelt device according to claim 2, wherein
said lock release determining device determines whether a state is maintained in which said motor is driven in a pull-in direction of said webbing and the lock state of said webbing is not detected by said lock state detecting device, and
when the lock release determining device determines that the state in which the lock state of said webbing is not detected by said lock release determining device is maintained, and said command for driving said motor is output while the motor is performing the wind-up operation so that a lock state of said webbing does not occur, and the priority of said command is equal to or higher than the predetermined level, said control device applies tension to said webbing.

7. A seatbelt device according to claim 3, wherein
said lock release determining device determines whether a state is maintained in which said motor is driven in a pull-in direction of said webbing and the lock state of said webbing is not detected by said lock state detecting device, and
when the lock release determining device determines that the state in which the lock state of said webbing is not detected by said lock release determining device is maintained, and said command for driving said motor is output while the motor is performing the wind-up operation so that a lock state of said webbing does not occur, and the priority of said command is equal to or higher than the predetermined level, said control device applies tension to said webbing.

8. A seatbelt device according to claim 4, wherein
said lock release determining device determines whether a state is maintained in which said motor is driven in a pull-in direction of said webbing and the lock state of said webbing is not detected by said lock state detecting device, and
when the lock release determining device determines that the state in which the lock state of said webbing is not detected by said lock release determining device is maintained, and said command for driving said motor is output while the motor is performing the wind-up operation so that a lock state of said webbing does not occur, and the priority of said command is equal to or higher than the predetermined level, said control device applies tension to said webbing.

* * * * *